US008138940B2

United States Patent
Horton et al.

(10) Patent No.: US 8,138,940 B2
(45) Date of Patent: Mar. 20, 2012

(54) MUNICIPAL OPERATIONS MONITORING AND ALERT SYSTEM

(76) Inventors: Cathy Horton, South Russell, OH (US); Kim Novotney, Lakewood, OH (US); John Herraghty, Cleveland, OH (US)

(*) Notice: Subject to any disclaimer, the term of this patent is extended or adjusted under 35 U.S.C. 154(b) by 447 days.

(21) Appl. No.: 12/434,392

(22) Filed: May 1, 2009

(65) Prior Publication Data
US 2010/0277307 A1     Nov. 4, 2010

(51) Int. Cl.
*G08B 5/00* (2006.01)
(52) U.S. Cl. ... 340/815.4; 340/506; 340/3.1; 340/539.1; 340/539.11
(58) Field of Classification Search ............... 340/506, 340/3.1, 539.1, 539.11
See application file for complete search history.

(56) References Cited

U.S. PATENT DOCUMENTS
5,400,246 A * 3/1995 Wilson et al. ............... 700/17
* cited by examiner

*Primary Examiner* — Daryl Pope
(74) *Attorney, Agent, or Firm* — Roetzel & Andress

(57) ABSTRACT

Methods and systems for efficient network and device-based monitoring and response to municipality functions, operations, infrastructure and utilities uses automated notifications of municipal agents or employees of municipal operations information. Notifications are delivered according to predefined rules, a hierarchical structure of categories to organize alerts and information in a logical order of critical importance and delivered by information systems within the municipality. A user interface is utilized to change the hierarchy, view alert information, and select issues for responsive action.

15 Claims, 11 Drawing Sheets

Fig. 7

MUNICIPAL OPERATIONS MONITORING AND ALERT SYSTEM

RELATED APPLICATIONS

There are no applications related to this application.

FIELD OF THE INVENTION

This disclosure and related inventions pertain to systems and software which provide municipalities with on-demand operational status of critical and non-critical components of municipal operations, infrastructure, infrastructure devices, equipment, and services.

BACKGROUND OF THE INVENTION

A typical municipality has a vast infrastructure which includes a number of facilities, services, and resources. This infrastructure must be maintained on a 24/7 basis in order to provide competent, effective city-wide services. Typical municipal services include public utilities management, water management, municipal accounting and information systems, traffic control, municipal parking control, video surveillance, transportation, weather-related services, and emergency services. Most municipalities have separate departments and agencies that are each responsible for a particular aspect of the infrastructure. Not surprisingly, very often each department or agency implements separate policies, communications protocol, information systems and data standards. It is very common that the communication and information systems of each department are not compatible with each other or are simply not connected to one another. While industry standards exist for application layer protocol, database schema and data objects, each department and each device within each department may have its own proprietary application layer that would require that a management device be customized to understand each proprietary protocol. This situation precludes master management of all departments and devices. The potential advantages of shared information among municipal operations and functions are not achieved.

In addition to system incompatibility issues, municipalities typically rely on manpower in areas where technology and/or automation could perform the job at hand. Full time employees are used to perform daily inspection and assessment of city facilities and resources. Not only are valuable, costly resources being utilized, it is time-consuming and results are difficult to communicate to those who are ultimately concerned. Municipalities are in need of a mechanism by which to organize and disseminate the flow of mission critical information throughout the infrastructure.

SUMMARY OF ME INVENTION

The current disclosure and related inventions provide systems and methods for automatically notifying municipal management and staff of infrastructure status and events, operating information and events. Sensor data and notifications from network-connected infrastructure sensors, including sensors on any type of municipality infrastructure device or equipment, are delivered to the monitoring and alert system according to pre-defined rules. A hierarchical structure of categories is used to organize alerts and information in order of importance and delivered by network and information systems to municipality personnel for example, by a wireless device interface. A user interface is utilized to change the hierarchy, view alert information, and select issues for action or other responses by system and device operations.

DESCRIPTION OF THE DRAWINGS

FIG. 7 is a screen shot of exemplary dashboard alerts;

DETAILED DESCRIPTION OF PREFERRED AND ALTERNATE EMBODIMENTS

Figure 1:
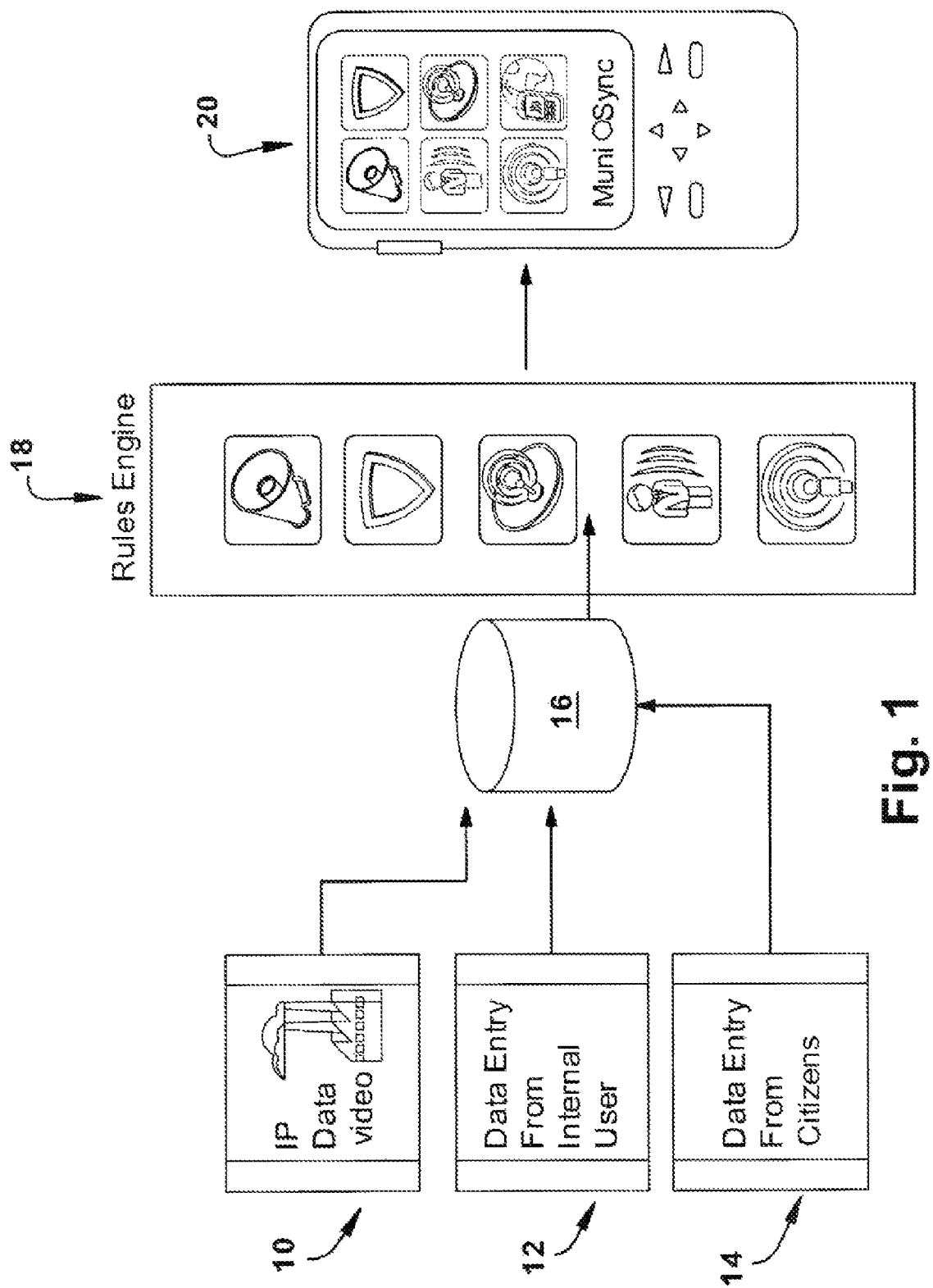
FIG. 1 is a diagram showing the flow of data through a representative municipal operational alert system of the disclosure.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The Municipal Operational Alert System (hereinafter referred to as 'MOAS') of the present disclosure and related inventions, serves as a municipality-wide management tool. The MOAS provides municipal leaders or managers a system through which there can be substantially constant, automated monitoring of all measurable municipal services within the municipal infrastructure. As used herein, the term "infrastructure" refers to all of the physical and organizational structures needed to facilitate the operation of the entire Municipal Operations Alert System. The system is capable of providing a simple and clear picture of the current health of a monitored area, such as a municipality, and providing an interface for responding to incoming data or alerts. The electronic monitoring is accomplished through the use of sensors contained within designated municipal components. These components may include, but are not limited to, municipal utilities (e.g., water, sewer, electricity, gas), traffic lights and signals, video surveillance, heating, ventilating and air conditioning (HVAC) systems, emergency alert systems, outdoor warning systems such as sirens, toxic event data (e.g., spills, radioactivity) meteorological data sources or any other measurable system that may be included under the realm of municipal services. A plurality of electronic sensors is coupled to corresponding sensor modules or agents running on each monitored device. Each sensor agent controls the relay of data from a corresponding sensor to one or more modules of a network device monitoring application. A critical feature of the MOAS is that it implements a municipality-wide standard that enables all measurable devices to be monitored and measured and to communicate with the MOAS using the same standard. The standard implemented by the MOAS is Simple Network Management Protocol (SNMP). SNMP consists of a set of standards for network management, including an application layer protocol, a database schema and a Set of data objects. Each sensor agent running on each monitored device reports information via SNMP to a network device monitoring software application, contained within the MOAS. Information sent via SNMP from each monitored device to the monitoring application is compared to predetermined threshold values set up within the monitoring application. A set of procedural rules and logic determines when an alert is to be issued, to whom the alert is to be issued and the severity level of each alert. All data, including alerts, received by the monitoring application, can be accessed through a software interface, as discussed below.

Alerts may be categorized by the alert source (water treatment plant, power plant, etc.), the responsible personnel (police, water, etc.) or by all alerts. An example of alert sources and corresponding alerts include, but are not limited to: Waster Water Treatment Plant (ump down, contamination alert, etc.); Power Plant pressure rising, consumption level peak, etc.); Buildings and Maintenance (door ajar at school #53; motion sensor activated in restricted zone, etc.); Traffic and Roads (traffic signal down, contamination alerts etc.); Emergency Broadcast (violent criminal in vicinity, contamination alert, etc.); and Citizen Alerts (domestic violence alert, service request etc.).

FIG. 1 contains a diagram showing the overall data flow through the MOAS which allows municipalities to receive alerts regarding the operational status of critical municipal components. The alerts may originate either from sensors contained within designated municipal components or from municipal employees or city residents who enter an alert via a designated web portal. Alert messages may be automatically sent to notify appropriate municipal employees of alert and related information with such notifications delivered according to pre-defined rules.

An alert message in the MOAS is initiated by an alert entry 10, 12, 14. Alert entries 10, 12, 14 may be initiated by at least several means, as further described. Once an alert has been entered into or received by the MOAS, the information is stored in a relational database system 16. From there, the information content of the alert entry is sent to a logic engine 18, which decides the level of priority and the identity of municipal agents or employees who will be notified of the alert. Once this has been decided, the appropriate agents/employees can receive the alert on a mobile wireless device 20 which may be a cellular phone, personal data assistant (PDA), tablet PC or any other mobile wireless device 20 suitably programmed and configured to receive the data content of the alert entry. The alert may by sent via text message (Short Message Service or SMS), email message, broadcast of a pre-recorded telephone message, instant message, or through any other communication medium. Once the alert has been accessed by the recipient agent/employee, he/she can respond to the alert or broadcast the alert to one or more additional employees, via the same network, intranet or other network such as the internet. The MOAS software is preferably designed to operate as a form driven workflow management solution. The term workflow, as used in this application, refers to the transfer of alerts, protocols and messaging between municipal employees.

Figure 2:
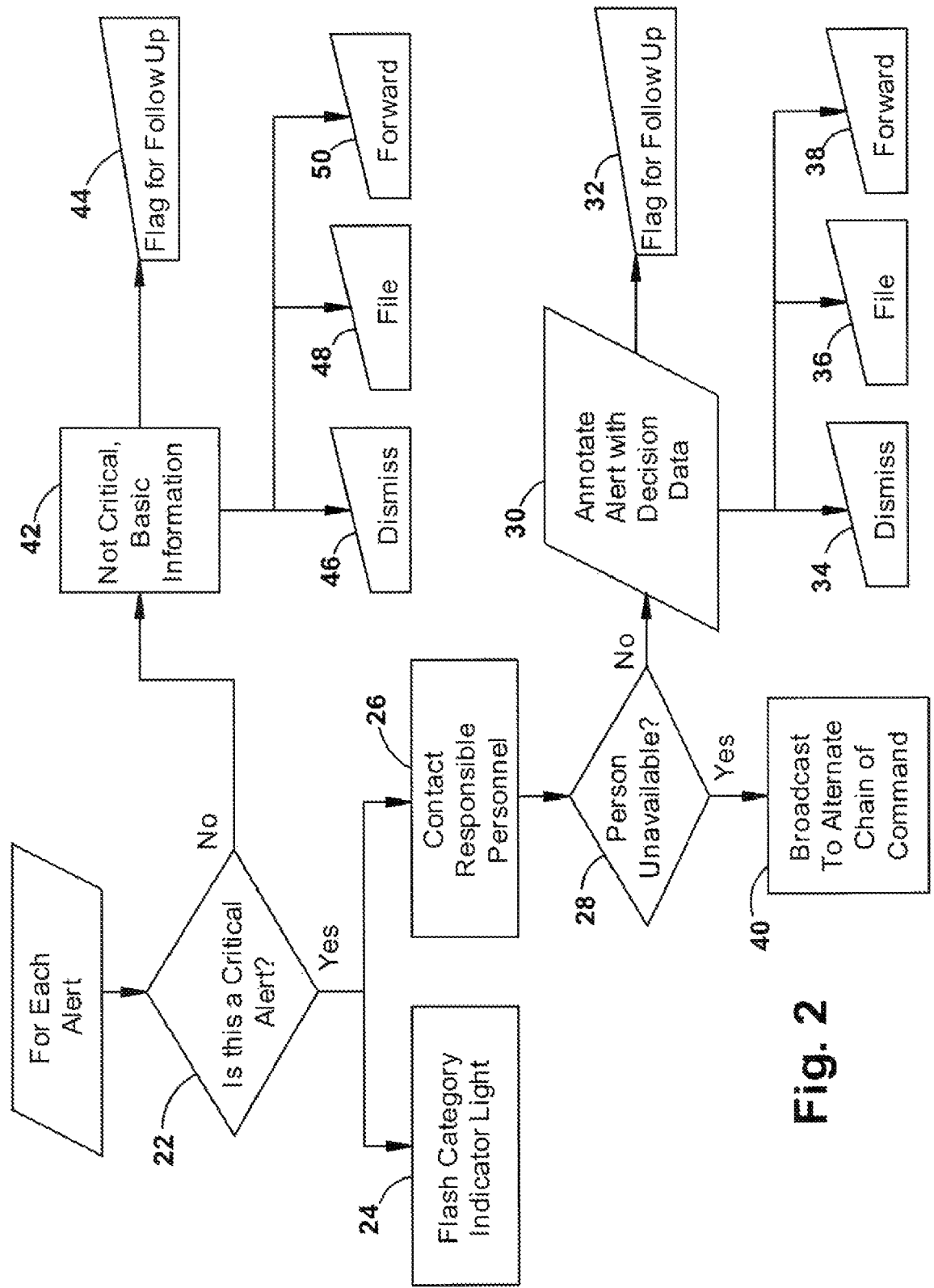
FIG. 2 is a flow diagram representing the alert communication process.

More specifically, the flow diagram of FIG. 2 presents in further detail, the process followed under the MOAS when an alert is received. Once an alert signal Occurs, the first decision, indicated at 22 is whether the alert is critical. If the alert is critical, two processes, indicated at 24 and 26 are initiated—the category indicator light, located on the user interface, is activated and responsible personnel are contacted. As described above, responsible personnel may be contacted via SMS, email, telephone, instant message or any other suitable communication medium. The next decision along this path, indicated at 28, is whether the responsible personnel are available. If yes, then as indicated at 30, the alert is combined with appropriate data describing the alert. The personnel receiving the alert has several manual options which include, flag the alert for follow up 32, dismiss the alert 34, file the alert 366, or forward the alert 38. If the responsible personnel are not available then, as indicated at 40, the alert is broadcast to an alternate along the chain of command. However, if the alert is not critical, as indicated at 42, the alert may be manually flagged for follow up 44, dismissed 46, filed 48 or forwarded 50.

Figure 3:
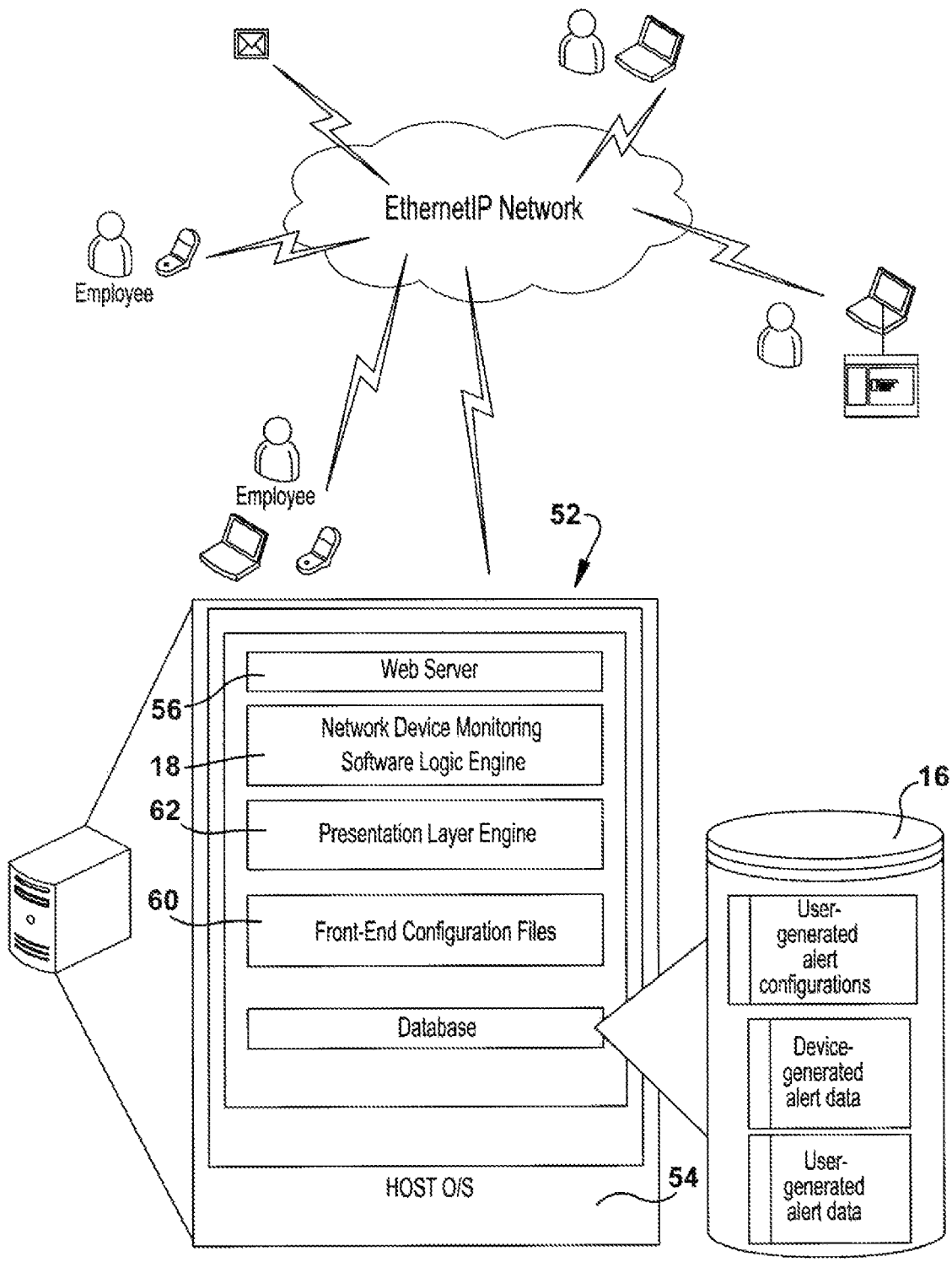
FIG. 3 is a diagram of representative system software interfaces.

The MOAS is broken up into three major sections; client; server; and data store. FIG. 3 illustrates one embodiment of software interfaces which can be employed. As mentioned above, the client (mobile wireless device 20) may be a wireless/mobile cell phone, PDA, PC, or any other web enabled device. The server portion of the system is responsible for authentication and authorization and all interaction with the data store. The host platform 52 consists of an operating system 54, a database 16 and a web server 56. Additional system components may include, for example, a Network Device Monitoring Software Logic Engine (hereinafter referred to as "logic Engine" 18), front-end configuration files (configuration of user interface for each alert profile) 60 and a presentation layer (graphical user interface and report provider) 62. An important component of the MOAS application is its interface with the Logic Engine 18, which is the foundation of all device-generated alerts 10, to be discussed below. The Logic Engine 18 is the repository and rules engine for all device configurations (device profile, conditions, notifications, etc.). The data store 16 portion of the system is used for the storage, retrieval and indexing of the data model. The data store 16 consists of a relational database system that is the repository for the data of the MOAS.

Figure 4A:
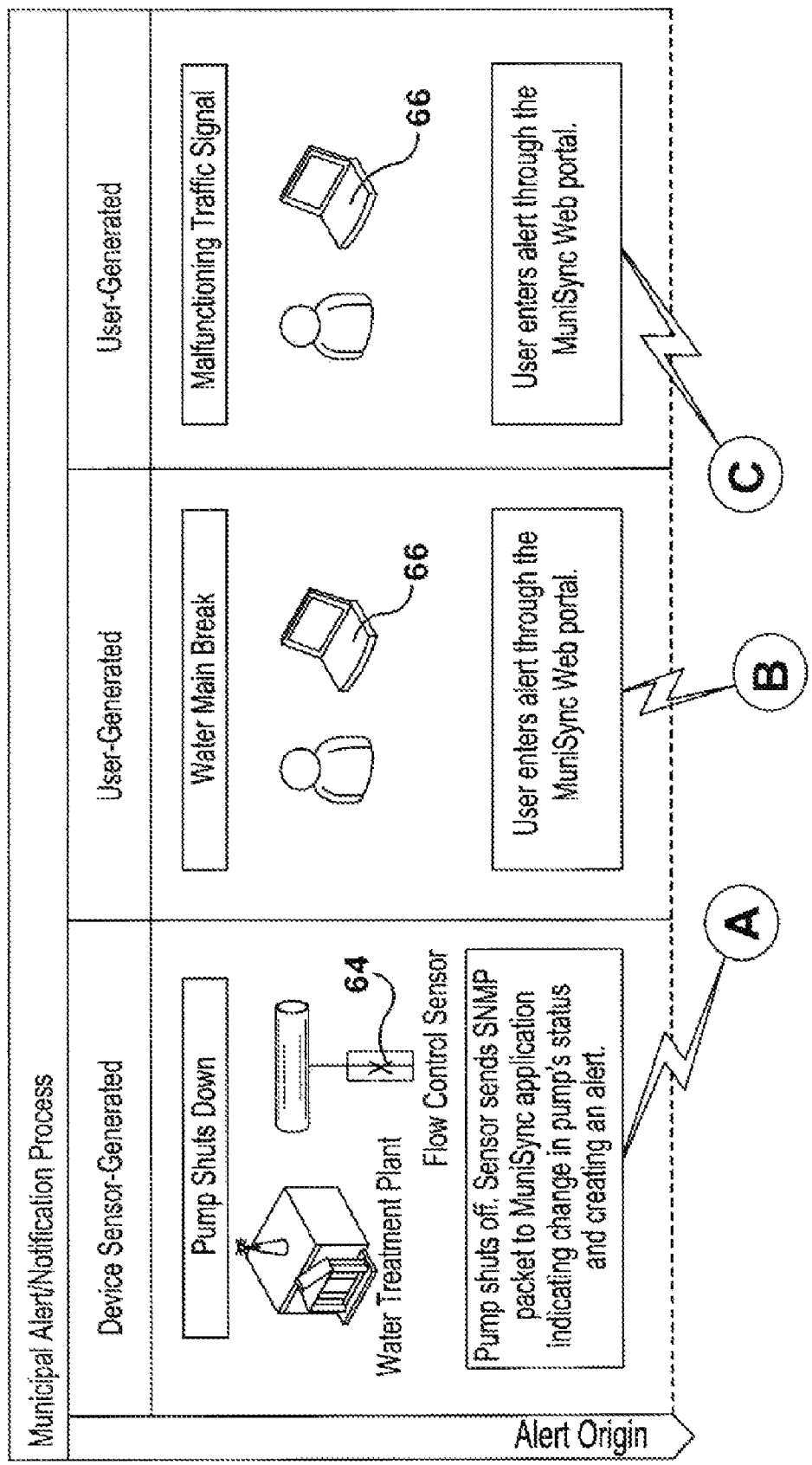
FIG. 4 is a diagram showing two exemplary methods of the alert notification process.
Figure 4B:
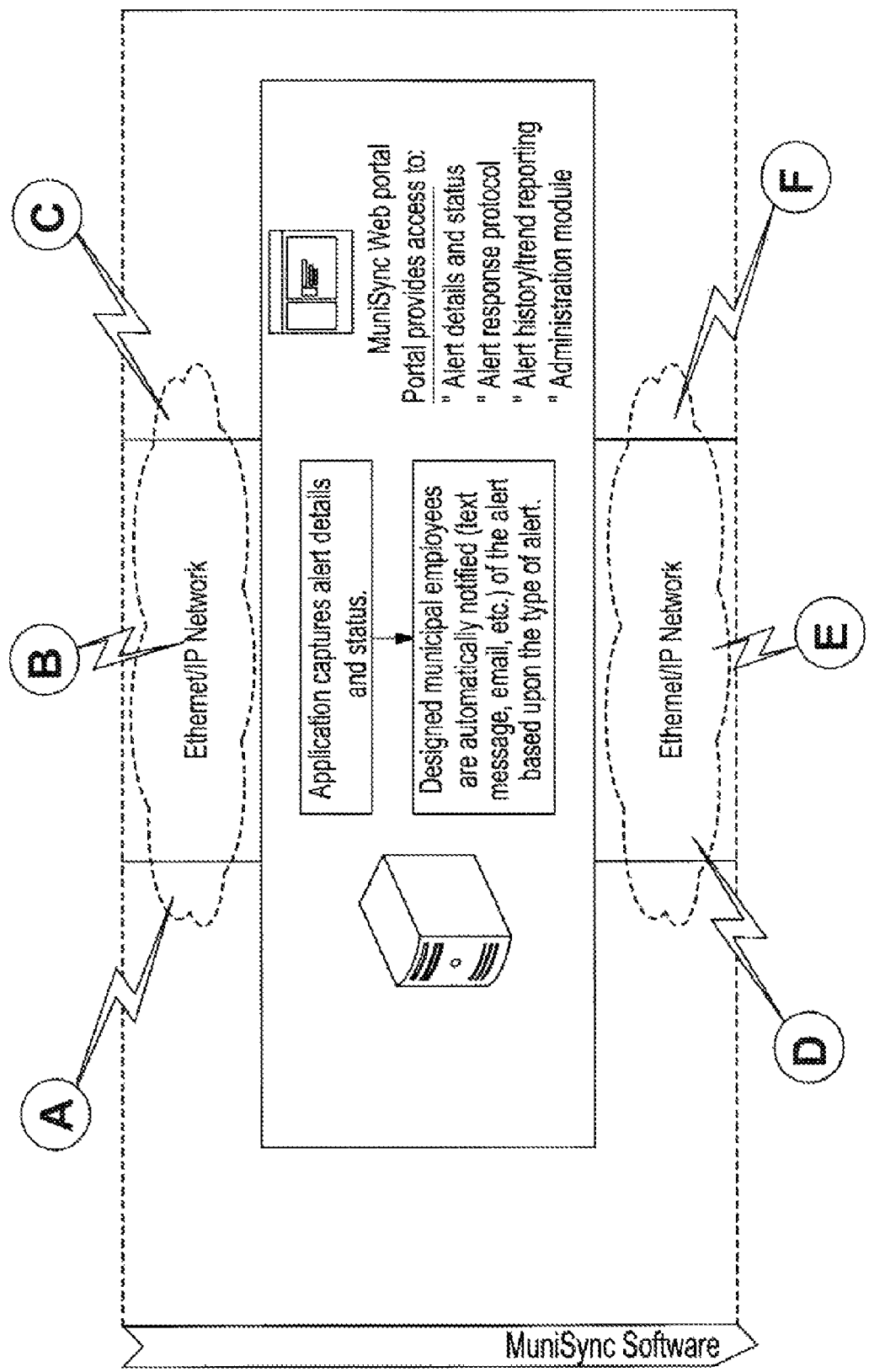
Figure 4C:
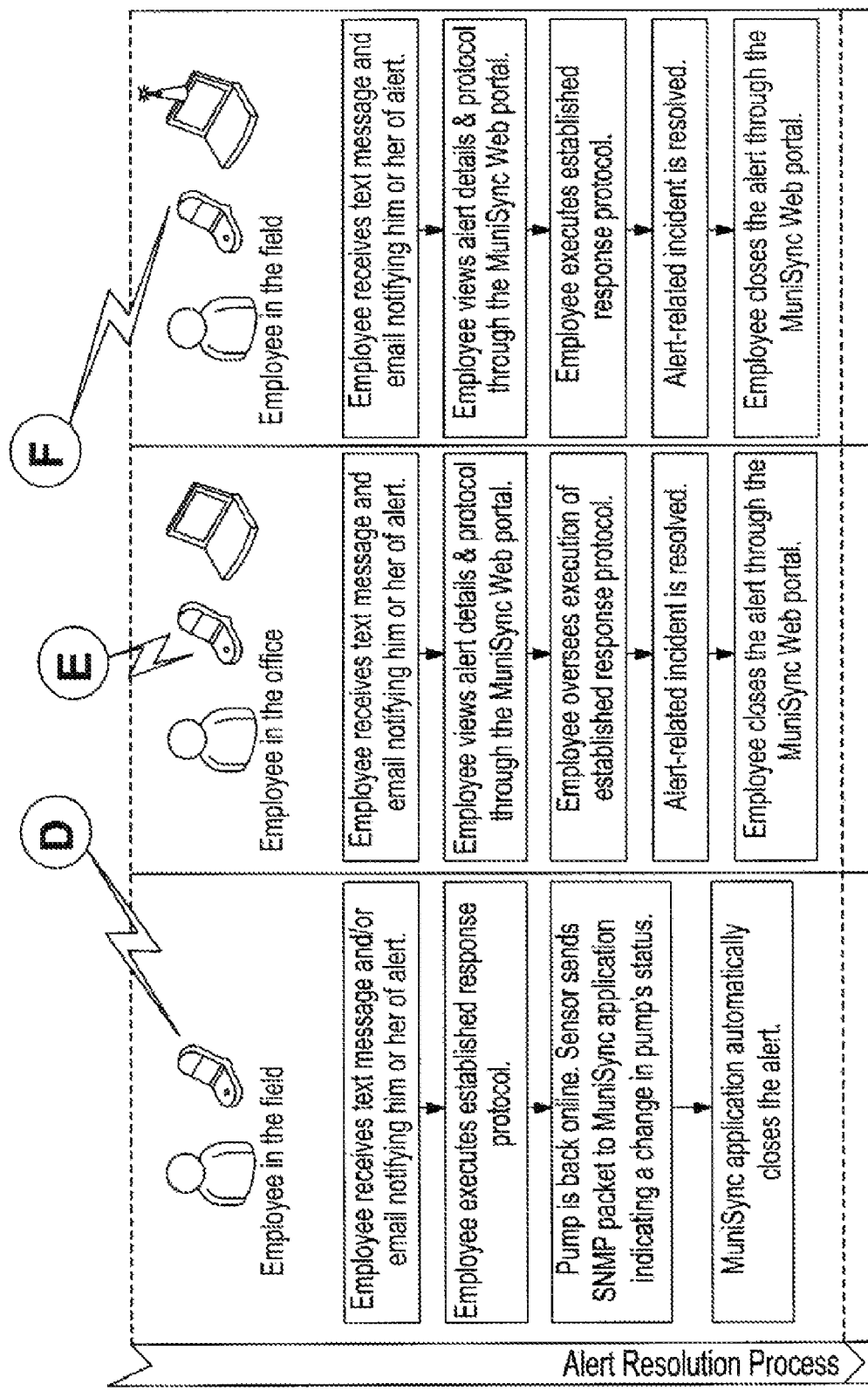

The alert notification process can be triggered by a device/sensor-generated alert 10, or by a user-generated alert 12, 14. FIG. 4 schematically illustrates these two alert notification processes. Device sensors 64 attached to designated components (pumps, traffic lights, etc.) within a municipality send signals, in the form of a SNMP packet, to the Logic Engine 18 when pre-defined conditions are met. The Logic Engine 18 generates alerts and notifications when status changes occur. Threshold values may be set up in Logic Engine 18 so that the software can use the threshold values to determine whether or not to send an alert and a status of the alert such as critical or a warning. For example, if a water pump shuts off, the sensor installed in the water pump sends an SNMP packet to the MOAS indicating a change in the pump's status and creating an alert. The application captures the alert details and status. An agent or employee in the field receives a text message and/or email notifying him or her of the alert. The employee executes the established response protocol and places the pump back on line. The sensor sends an SNMP packet to MOAS indicating a change in the pump's status, and can alternatively be configured to automatically close the alert.

The other type of alert is a user-generated alert 12, 14. Municipal employees and city residents may enter an alert through a web portal 66. Once an alert has been manually entered through the web portal 66, MOAS captures the alert details and status and stores them in the database. Designated municipal employees are automatically notified of the alert based upon the type of alert. For example, if there is a water main break, a municipal employee would manually enter the alert through the web portal 66. The application would capture the alert details and designated municipal employees are automatically notified of the alert. The employee receives the alert and views alert details and protocol through the web portal 66. Once the alert has been resolved, the employee closes the alert through the web portal 66. City residents may also enter alerts, such as malfunctioning traffic signals, through the web portal 66.

The web portal 66 provides access (wired and wireless) for alert details and status, alert response protocols, alert history/trend reporting and system administration. The alert history/trend reporting feature contains report formats and is enabled for custom assembly of reports by department, region, administrative division or municipal function. It is intended to provide information at a high level. It enables designated managers to analyze volume, trends and patterns of alerts within a municipality. The system administration feature allows an administrator to maintain lists of groups and/or users, to maintain alert profiles, and to configure alert notification parameters. Configuration entails pre-determining who is to be notified, how often and by what communication method for each type of alert.

Figure 5:
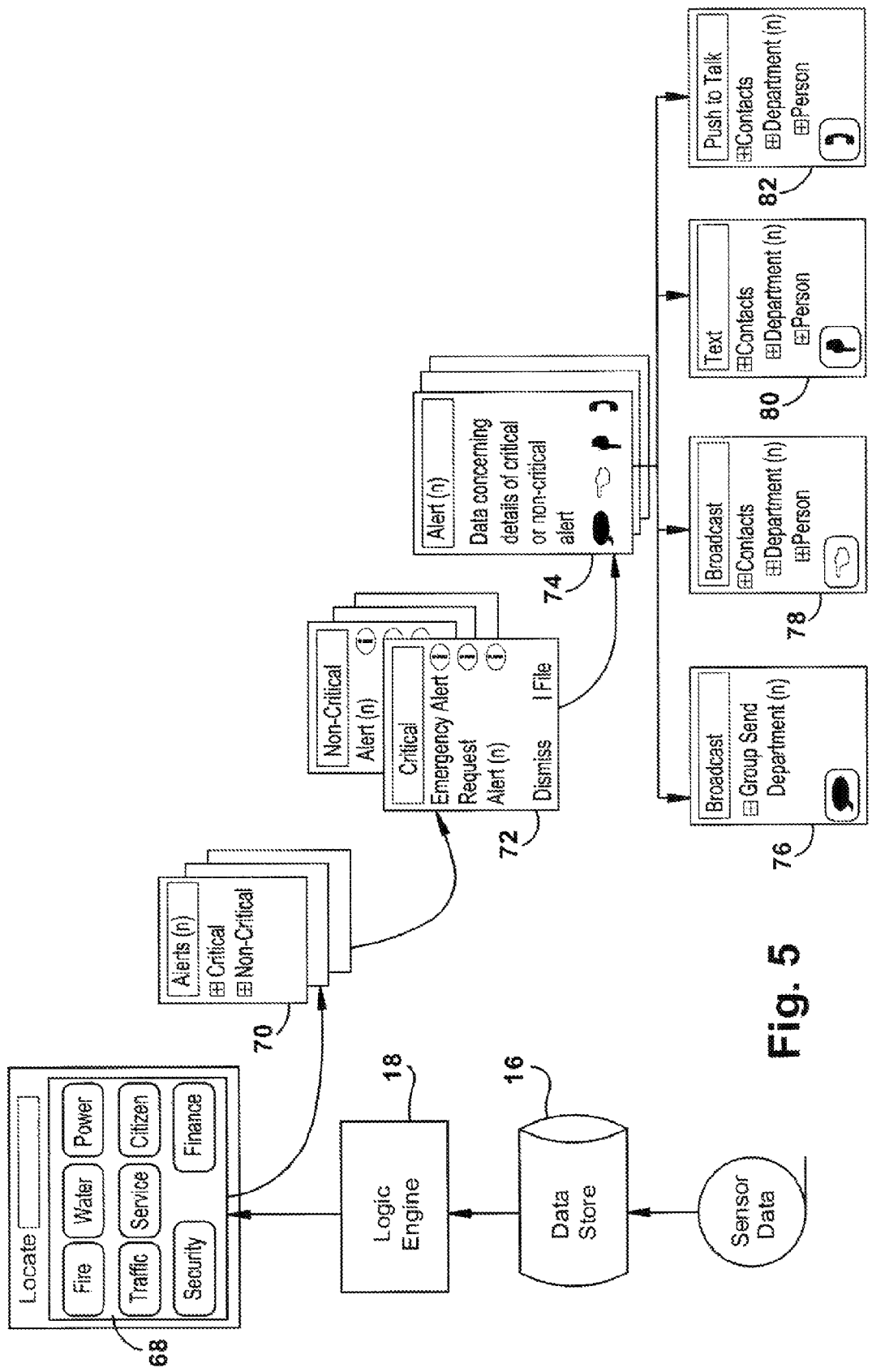
FIG. 5 is a diagram showing a mobile device alert interface.

A diagram of the mobile device alert interface is located in FIG. 5. The alerts interface can be located on any cell phone device 20 and as an initial navigation method it visually categorizes the data flow from the logic engine and the data store. As shown at 68, the mobile device alert interface contains icons representing all departments under which alerts may be categorized, such as fire, water, power, etc. A department icon changes color based on the status of alerts in the queue. Outstanding critical alerts will appear in red. When an alert is sent to the device, the appropriate icon will change to the appropriate color and it will flash until the alert has been received or acknowledged. Drilling down one level, as indicated at 70, once a department icon has been selected, the mobile device alert interface categorizes alerts by criticality. The user may choose to view critical or non-critical alerts. Drilling down to the second level, as indicated at 72, the mobile device alert interface will list all critical or non-critical alerts depending on the criteria selected in the former screen. Here, the user has the option to either dismiss or file a selected alert. Drilling down to a third level by selecting an alert, as indicated at 74, will prompt a new screen which provides the user with specific details about the alert selected. This screen permits actions such as broadcast 76, forward 78, text 80, or push to talk 82, so that the user may choose a method of mobile communication for which to further communicate the alert. A list of contact groups is also presented.

Figure 6:
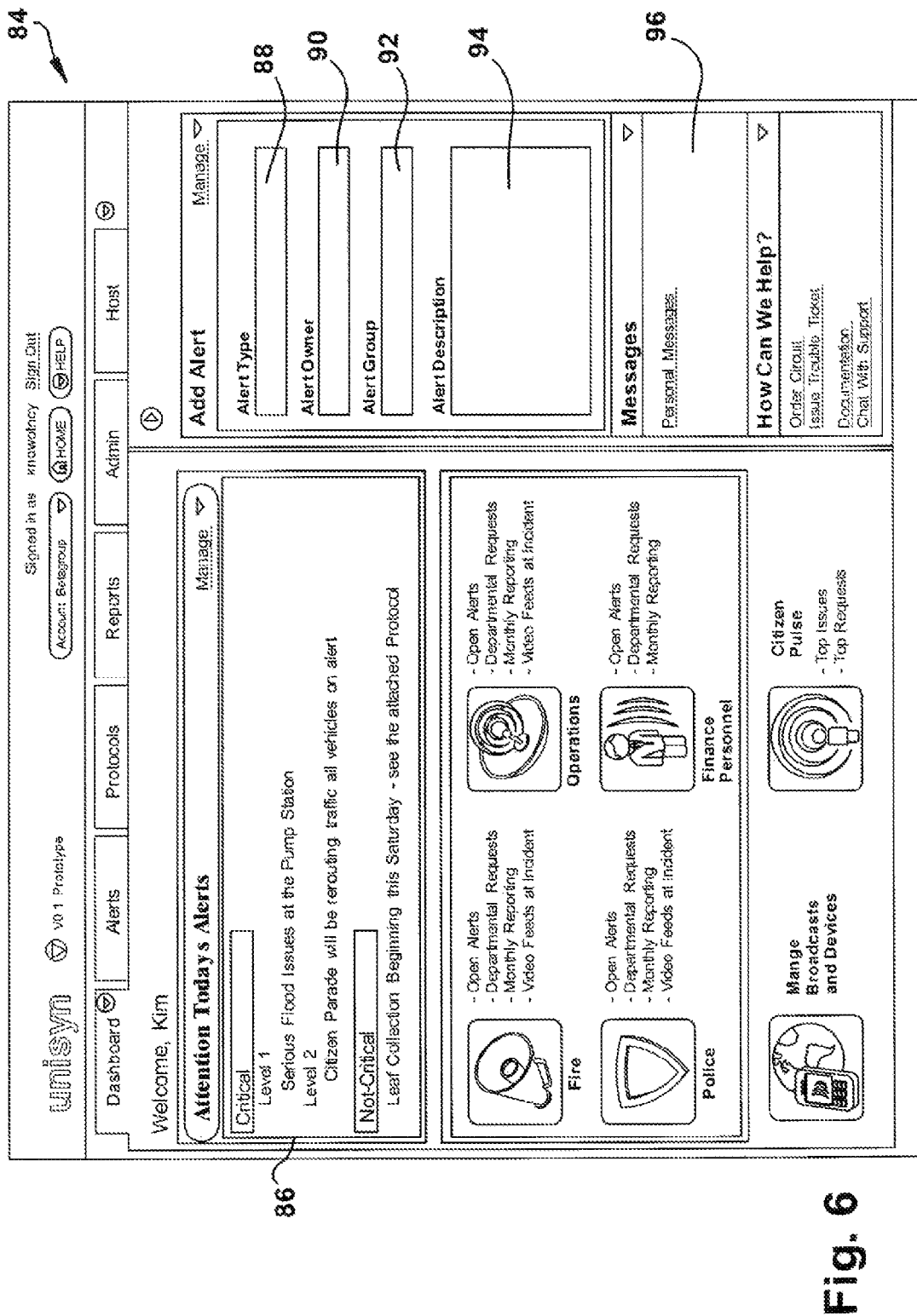
FIG. 6 is a screen shot of a main dashboard of the system.
Figure 7:
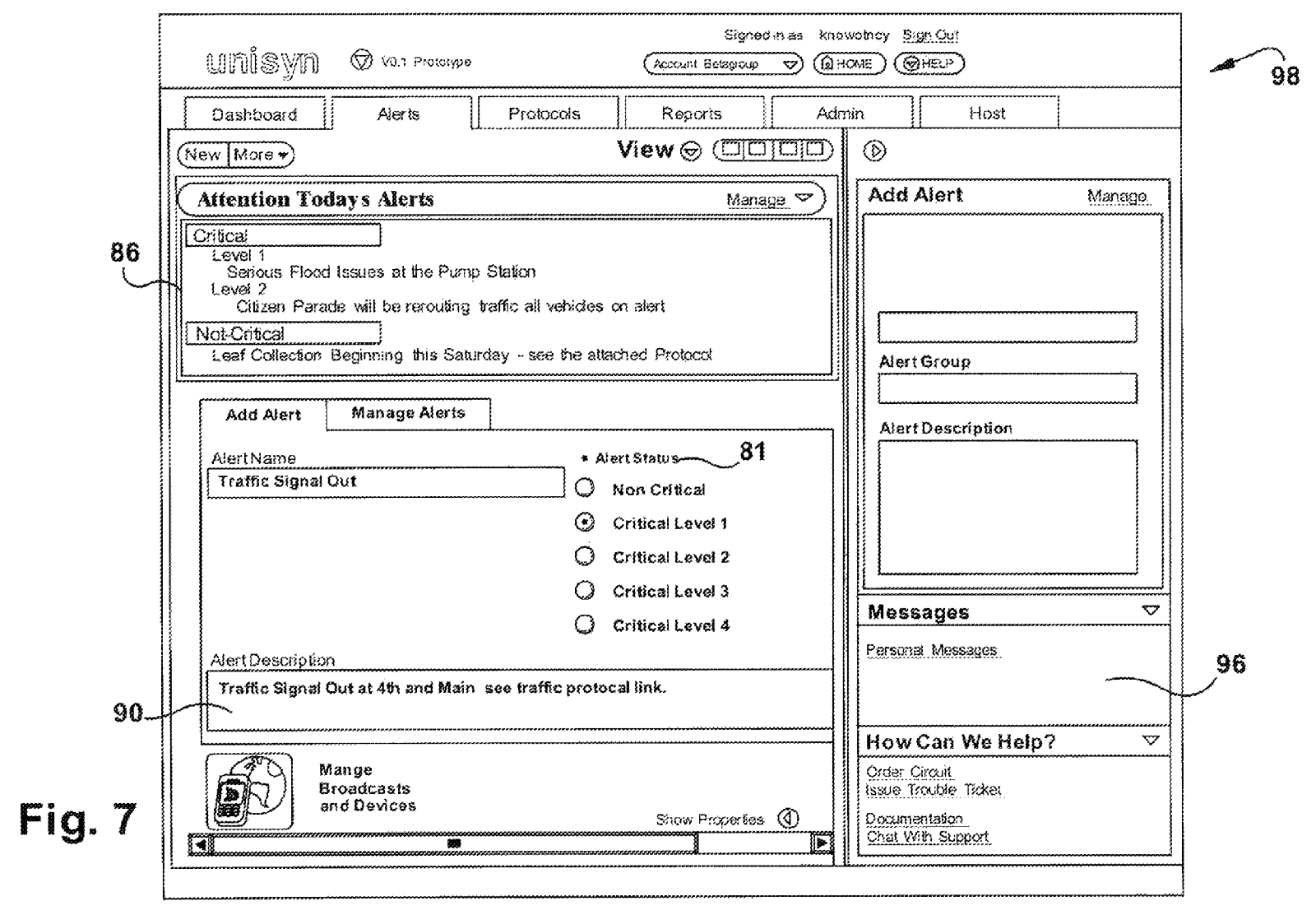
Figure 8:
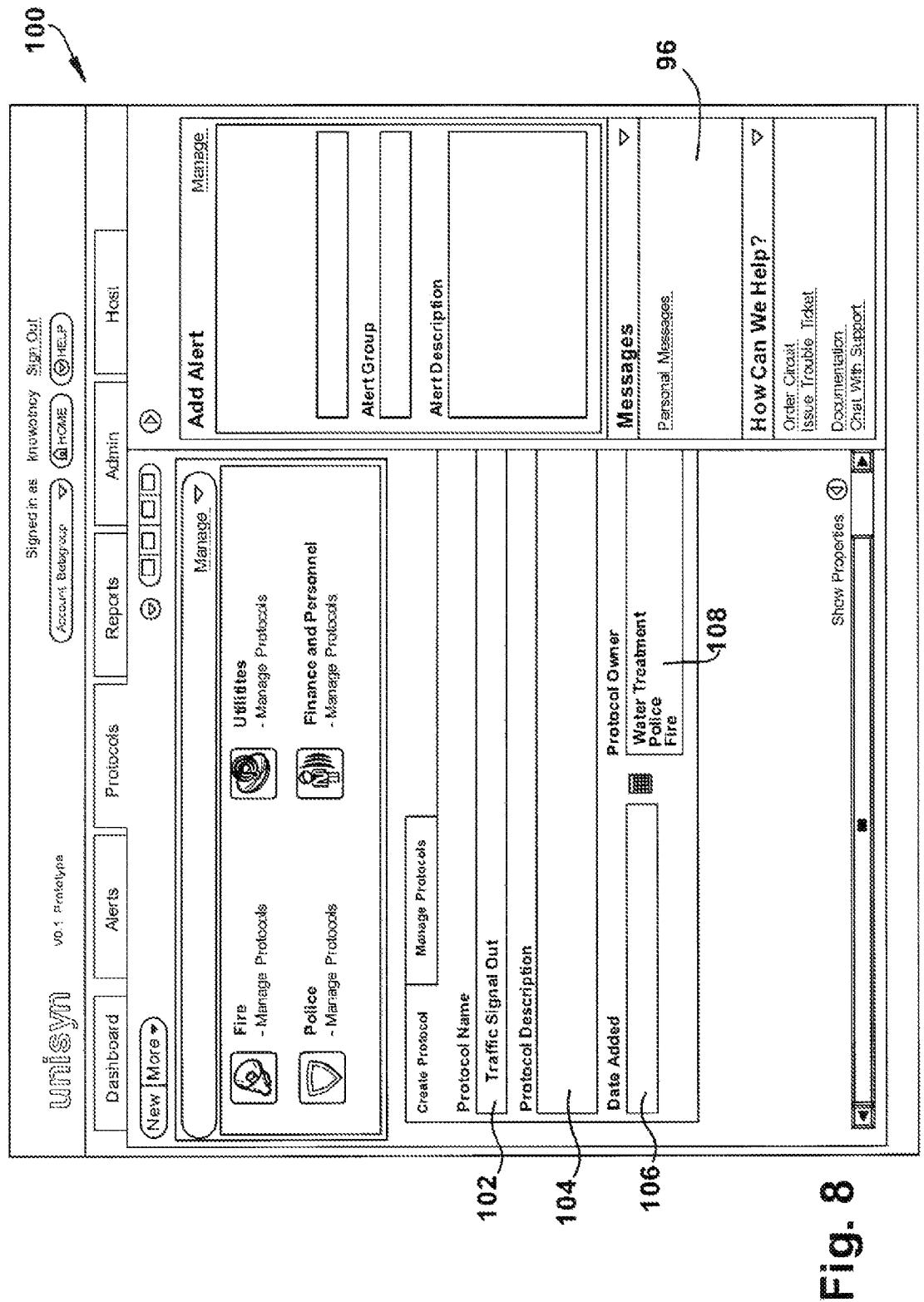
FIG. 8 is a screen shot of a protocols dashboard.
Figure 9:
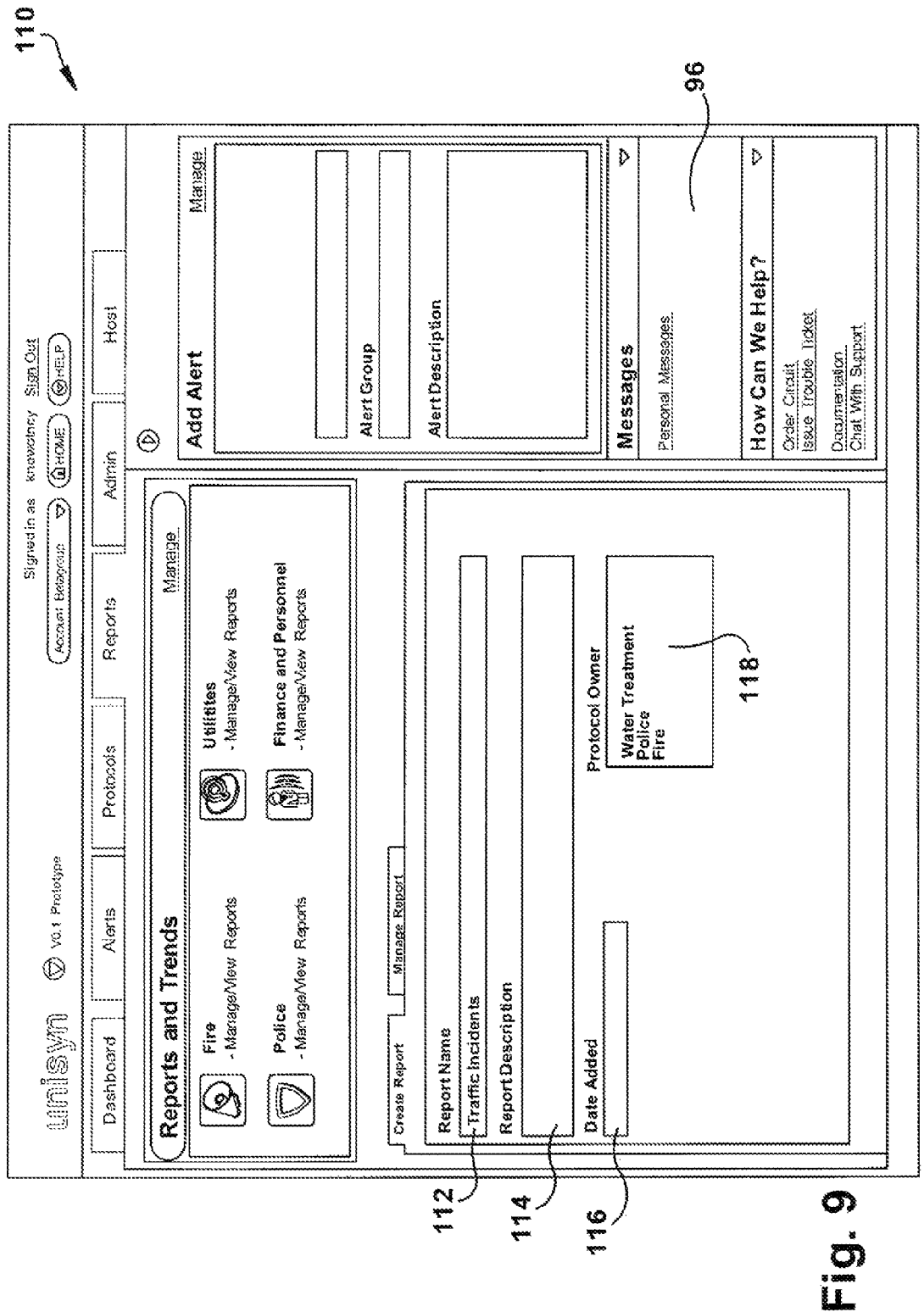
FIG. 9 is a screen shot of a reports and trends dashboard.

Representative embodiments of a user interface encountered through the web portal are set forth in FIGS. 6 through 9. There may be any number of screens in the user interface and any number of routes between the screens, and there is no restriction implied as to either characteristic by the representative examples. The first user interface screen, the main dashboard 84, is shown in FIG. 6. The main dashboard 84 contains a listing of current alerts 86 by priority (critical/non-critical). It also allows the user to select a department by choosing the appropriate icon. The user may also add an alert by entering information such as alert type 88, alert owner 90; alert group 92 and alert description 94 or view personal messages 96. The alerts dashboard 98, shown in FIG. 7 also contains a list of the current alerts 86 by priority level. It also enables the user to add or manage alerts by entering information such as alert name, selecting an alert status from a series of radio buttons 88 and entering an alert description 90 into the application. The user may also review personal messages 96. The protocols dashboard 100, shown in FIG. 8 is an area where a user can create new and/or manage protocols. This may be done by department by selecting the appropriate icon and entering the protocol name 102, protocol description 104, date added 106 and protocol owner 108. The user may also add an alert or view personal messages 96. The reports and trends dashboard 110, shown in FIG. 9 allows the user to create and manage reports by department. The user must select the appropriate icon indicating departments and enter a report name 112, report description 114, date added 116, and report owner 118. The user may also add an alert and view personal messages 96.

The invention claimed is:

1. A municipal operations alert system comprising:
   a web server comprising:
   a database;
   at least one front end configuration file; and
   a web portal;
   a device monitoring software logic engine;
   at least one device sensor attached to at least one configured external device; and
   at least one mobile wireless communications device, the device monitoring software logic engine monitors the status of the at least one configured external device based upon Simple Network Management Protocol (SNMP) packet data received from the at least one sensor attached to the at least one configured external device;
   the Simple Network Management Protocol (SMNP) packet data received from the at least one sensor attached to the at least one configured external device is stored in the database;
   under a pre-configured alarming condition, the device monitoring software logic engine generates at least one alert when a status change occurs based on the Simple Network Management Protocol (SNMP) packet data received from the at least one sensor attached to the at least one configured external device;
   the alert generated by the device monitoring software logic engine is sent to the at least one mobile wireless communications device;
   wherein the user selects an department category on a first display screen of the at least one mobile wireless communications device, selects a criticality subcategory on a second display screen, accesses at least one alert item on a third display screen, and
   wherein the user further selects a method of communication selected from broadcast, forward, text, or push to talk.

2. The municipal operations alert system of claim 1 wherein once an alert has been resolved, the at least one sensor attached to the at least one configured external device sends an SNMP packet to the device monitoring software logic engine indicating a change in status and the device monitoring software logic engine automatically closes the alert.

3. The municipal operations alert system of claim 1 wherein threshold values are set up in the device monitoring software logic engine to determine whether or not to generate an alert and whether an alert is critical or a warning.

4. The municipal operations alert system of claim 1 whereby a user may enter an alert via the web portal where the alert details are captured in the database and an alert is generated by the web portal and sent to at least one mobile wireless communications device.

5. The municipal operations alert system of claim 4 whereby once the alert has been resolved, the user closes the alert through the web portal.

6. The municipal operations alert system of claim 4 wherein the user is a municipal employee.

7. The municipal operations alert system of claim 4 wherein the user is a city resident.

8. The municipal operations alert system of claim 4 wherein the web portal provides alert details and status.

9. The municipal operations alert system of claim 4 wherein the web portal provides alert response protocols.

10. The municipal operations alert system of claim 4 wherein the web portal provides alert history and trend reporting.

11. The municipal operations alert system of claim 4 wherein the web portal provides system administration whereby an administrator can maintain lists of groups and/or users, maintain alert profiles, and configure alert notification parameters.

12. The municipal operations alert system of claim 4 wherein the web portal contains a main dashboard which: lists all current alerts by priority; allows the user to select a department by selecting an appropriate icon; and allows the user to add an alert by entering an alert name, alert status and an alert description.

13. The municipal operations alert system of claim 4 wherein the web portal contains an alerts dashboard which: contains a list of the current alerts by priority level; enables the user to add or manage alerts by entering an alert name, alert status, and an alert description; and enables the user to view personal messages.

14. The municipal operations alert system of claim 4 wherein the web portal contains a protocols dashboard which: enables the user to create a new protocol; manage a protocol; add an alert; and view personal messages.

15. The municipal operations alert system of claim 4 wherein the web portal contains a reports and trends dashboard which: allows the user to create and manage reports by department; add an alert; and view personal messages.

* * * * *